UNITED STATES PATENT OFFICE.

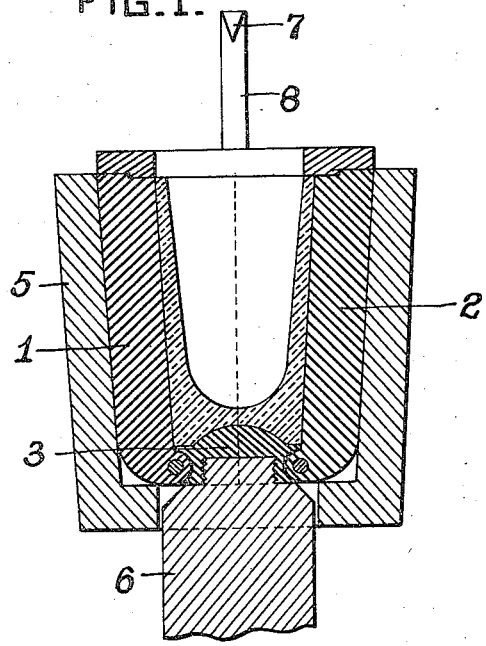
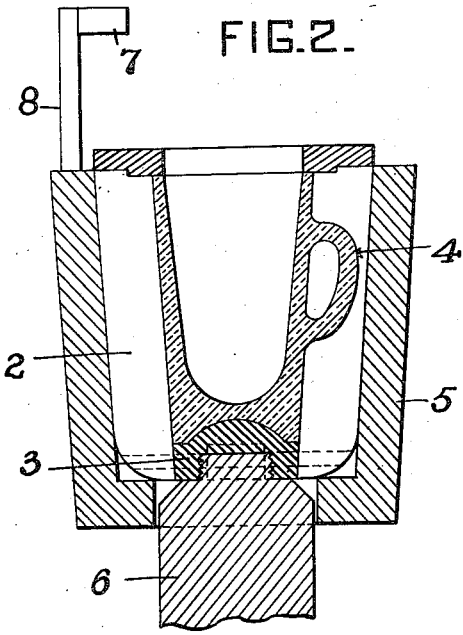
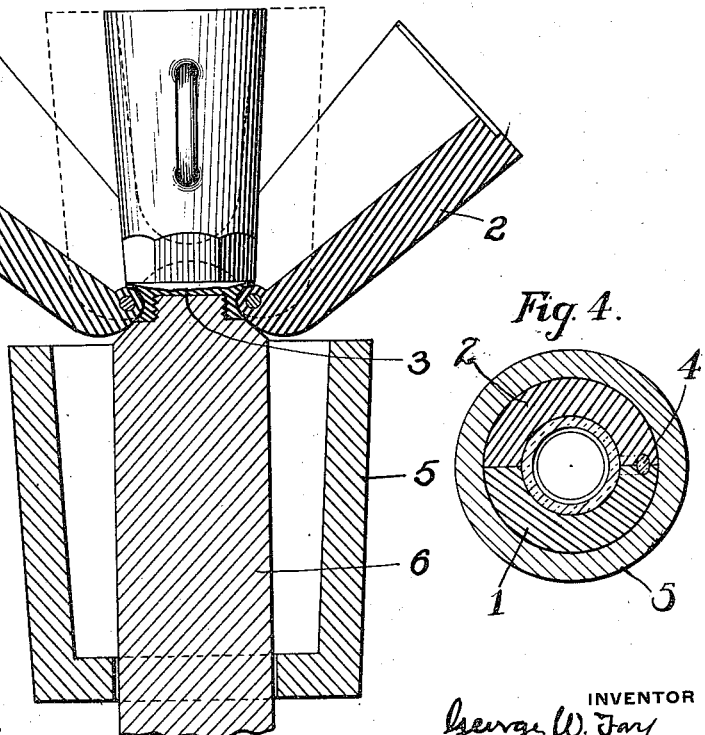
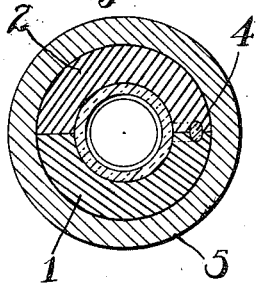

GEORGE W. FRY, OF MORGANTOWN, WEST VIRGINIA.

MOLD FOR GLASSWARE.

975,409.

Specification of Letters Patent.   Patented Nov. 15, 1910.

Application filed April 6, 1910.   Serial No. 553,740.

*To all whom it may concern:*

Be it known that I, GEORGE W. FRY, residing at Morgantown, in the county of Monongalia and State of West Virginia, a citizen of the United States, have invented or discovered certain new and useful Improvements in Molds for Glassware, of which improvements the following is a specification.

Great difficulty has been encountered in the manufacture of glass articles having handles integral therewith such as mugs for the reason that the matrix for the handle must be formed in the meeting faces of the mold sections, and it has been found nearly impracticable to hold the sections sufficiently tight to prevent a fruning of the glass during the pressing operation. As is well known in the art the large majority of such handled articles are comparatively large and have thick walls, hence in order that the glass may chill quickly after pressing it is necessary that it be comparatively cool when placed in the mold so that a very heavy pressure is required to cause the glass to flow. The portions of the mold forming the hinge and connecting parts cannot be increased in thickness sufficiently to prevent any springing or yielding under the heavy pressure.

The invention described herein has for its object a mold and holder or clamping member, so constructed that the mold sections may be unyieldingly held in closed position during the pressing operation.

The invention is hereinafter more fully described and claimed.

In the accompanying drawing forming a part of this specification Figure 1 is a sectional elevation showing my improved molding mechanism; Fig. 2 is a similar view but on a plane at right angles to that of Fig. 1, Fig. 3 is a view similar to Fig. 2 showing the mold raised and opened, and Fig. 4 is a transverse section of the mold and holding abutment; said parts being in the position shown in Fig. 2.

In the practice of my invention the mold is formed of a plurality of sections 1 and 2 preferably two. These sections, in lieu of having their swinging axis parallel with the axis of the mold, as is the usual practice, have their lower ends hinged to the punty plate or base 3 of the mold, the axis of the opening movement of the sections being at an angle to the axis of the mold and in a plane parallel with the meeting faces of the sections. The matrix 4 for the handle is formed in adjacent faces of the mold sections as has heretofore been the practice.

The exterior periphery of the mold may be circular or angular as desired, but is made slightly tapering in the direction of its height, so as to enter with a wedging action between abutments or holding walls, whereby the sections will be rigidly held in closed position. While it is preferred that holding means should be made in the form of an annular block, as shown, it is only necessary that, when closed, the mold sections should bear against external abutments so arranged with reference to each other, that the sections will be rigidly held in closed position during the pressing operation. As stated the holding or clamping means are preferably made in the form of an annular block 5, having its inner wall tapering to correspond with the taper of the exterior of the mold so that when the mold is drawn down into the block there will be a wedging action forcing the sections together. The wall of the block can be made of any desired thickness to insure rigidity of the sections relative to each other. As the stress of the pressing operation is on the block the walls of the mold proper can be made comparatively thin or light.

While the mold can be moved into and out of the block by any suitable means it is preferred to secure the base or purity plate to a rod 6 which can be shifted by any suitable means on the pressing machine.

It is probable that the mold sections will move apart as the mold is moved outwardly from the block, as the pivotal axes of the sections will be within the centers of gravity of the sections as shown in Figs. 1 and 3. But it is preferred to insure the opening movement by suitable means as a wedge 7, supported by an arm 8 with its edge in line with the plane of contact of the meeting faces of the sections.

I claim herein as my invention.

1. The combination of a mold formed of sections movable in planes substantially at right angles to the meeting faces of the sections and provided with a matrix extending between the meeting faces of the sections, abutments or bearings arranged to bear upon and hold the sections in closed position, and means for moving one of said parts relative to the other.

2. The combination of a punty plate or base, a mold formed of sections pivotally connected to the base and provided with a matrix extending between the meeting faces of the sections said sections having their pivotal axes at an angle to the axis of the mold and in planes substantially parallel with the meeting faces of the sections, means for shifting the base or punty plate, and stationary abutments or bearings for forcing the mold sections into closed position.

3. The combination of a base or punty plate mold sections hinged to the base, an annular block, means for shifting the punty plate and means for forcing the sections apart.

4. The combination of a mold formed of sections and provided with a matrix extending between the meeting faces of the sections, said sections being movable to and from closed position in planes substantially at right angles to their meeting faces, an annular block having internal transverse dimensions substantially equal to the external of the mold, and means for moving one of said parts relative to the other.

In testimony whereof, I have hereunto set my hand.

GEORGE W. FRY.

Witnesses:
ALICE A. TRILL,
THOS. J. ELBEL.